UNITED STATES PATENT OFFICE.

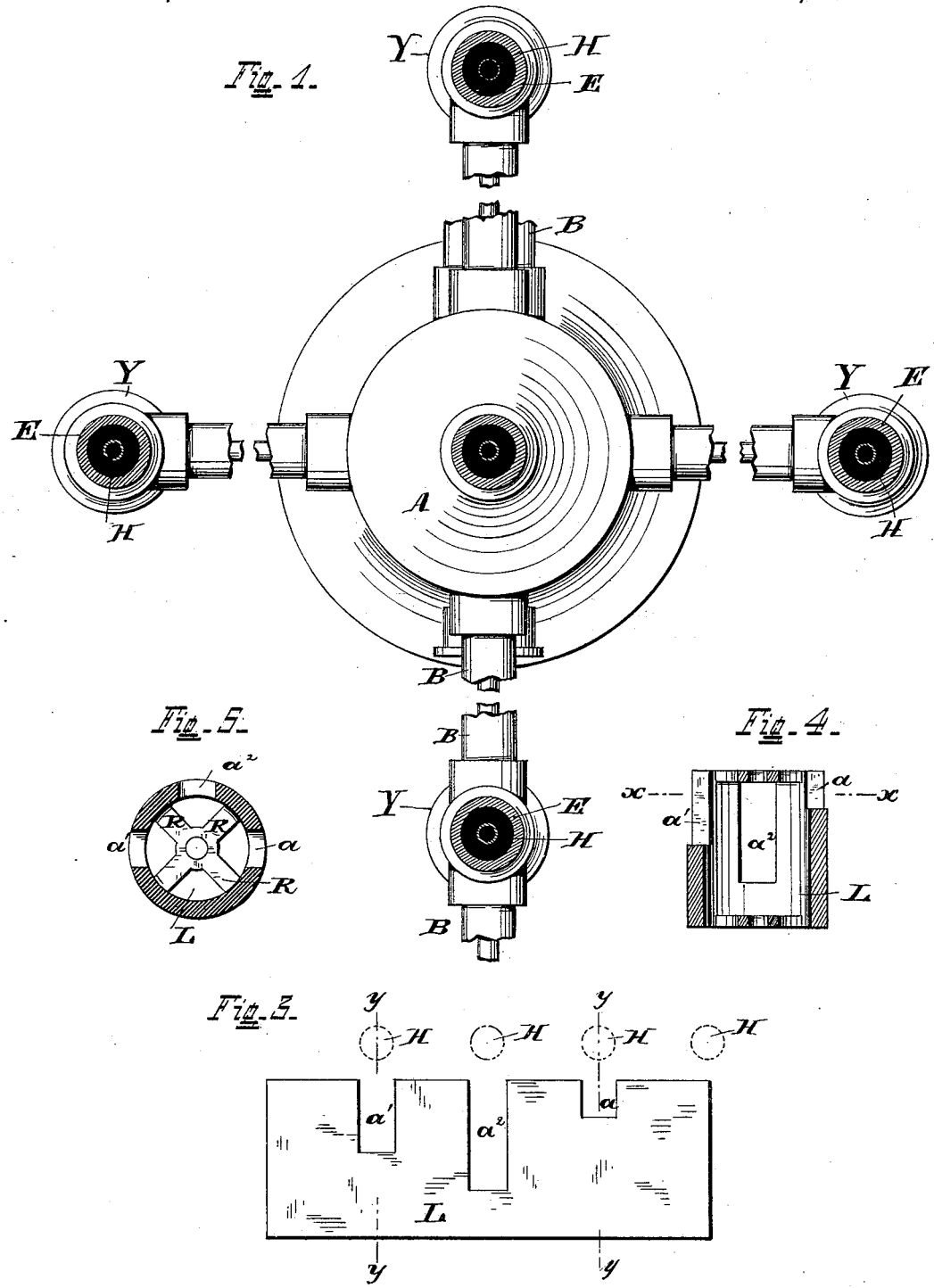

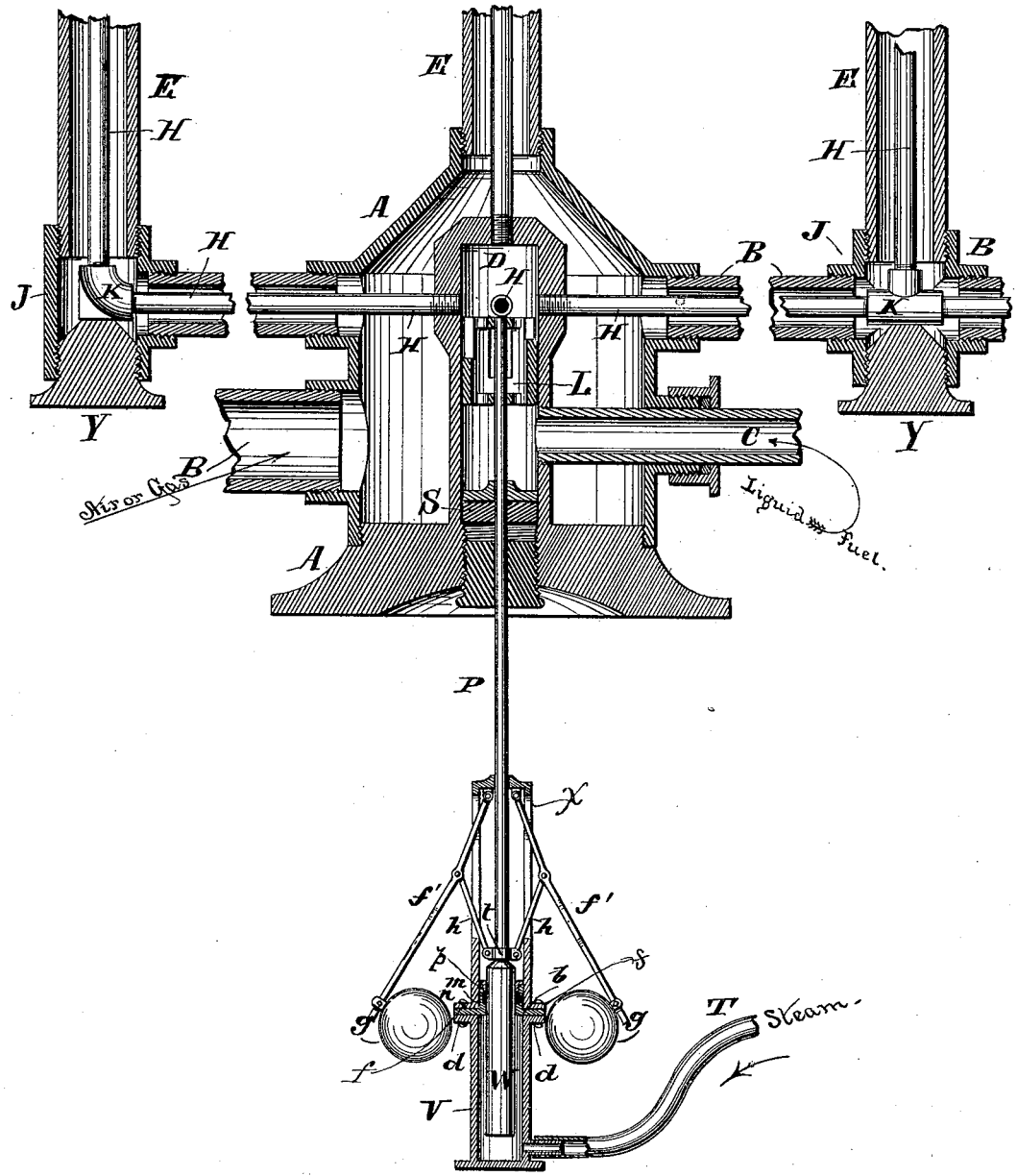

CHARLES L. MITCHELL, OF CINCINNATI, OHIO.

DEVICE FOR THE CONDUCTION OF LIQUID FUEL.

SPECIFICATION forming part of Letters Patent No. 351,391, dated October 26, 1886.

Application filed January 16, 1885. Serial No. 153,114. (No model.)

*To all whom it may concern:*

Be it known that I, CHARLES L. MITCHELL, a resident of Cincinnati, in the county of Hamilton and State of Ohio, have invented new and useful Improvements in Devices for the Conduction of Liquid Fuel to Burners and Apparatus for Regulating the Supply of said Fuel, of which the following is a specification.

My invention is applicable to the description of burner set forth in my application for Letters Patent for improvements in the consumption of liquid fuel, filed February 25, 1884. It is also applicable to all descriptions of hydrocarbon-burners, wherein the liquid fuel is fed through a conduit to an orifice, and is commingled with or dissipated by or (as is the case, for example, in my said application) atomized by gas, air, steam, or vapor.

The several features of my invention, and the various advantages arising from their use conjointly or otherwise, will be apparent from the following description.

In the accompanying drawings, making part of this description, Figure 1 is a plan or top view illustrating a portion of my improved apparatus. Fig. 2 represents a vertical central section of the device shown in Fig. 1, and taken through the center of the middle portion and through the longitudinal center of two outlying burners and their connecting-pipes, respectively, located on opposite sides of the middle portion of said group of burners. Fig. 3, Sheet 1, illustrates a preferred form of peripheral surface of a valve for regulating and cutting off the supply of liquid fuel to the outlying burners of said group, this hollow valve being spread out flat for purposes of explanation. Fig. 4, Sheet 1, represents a vertical central section of said hollow valve, the section being taken in the planes, respectively, passing through the dotted lines in Y Y of Fig. 3, and the central connections and supports of the valve being omitted. Fig. 5, Sheet 1, represents a top view of said valve.

That feature of my invention which consists in the novel mode of constructing and connecting a number or battery of burners is shown substantially in Figs. 1 and 2, and is as follows: A central reservoir, A, is connected at one side to the main air or gas supply pipe B, and communication is thus established between the interior of said pipe and the interior of the said reservoir A. Through another portion of its periphery or side of the said reservoir passes the liquid-fuel-supply pipe C, whose inner end is connected to central fuel-receiver, D, and establishes communication between the interior of pipe C and the interior of said fuel-receiver D. One burner is located over the top of said gas or air reservoir A, and communication between the latter and said burner is established by means of its shell or conduit E, connected to the top of said reservoir. Other burners are located at suitable distances around the central air or gas receiver A, and communication between the latter and these burners is established through their respective conduits E, which latter are suitably connected to the receiver. In connection with each burner there is provided a liquid-fuel-supply tube, H, and each burner is connected directly or in a suitable manner, and the tube H is continued on from the burner or the neighborhood of the latter back through its surrounding air or gas conduit E to the central liquid-fuel receiver, D, and is connected thereto, so that communication between the interior of fuel-receiver D and of tube H is established. Where the conduits immediately connected with the burners are vertical, as shown, the conduits will be provided with suitable elbow-connections. For example, in conduit E there will be an elbow, J, and in conduit H there will be an elbow, K. A suitable bottom or base, as Y, may be employed, and this base may be used, as shown, to support the elbow and vertical tube H. The central air or gas receiver, A, and the central liquid-fuel receiver, D, are supported in any desired manner, preferably by means of a bottom or standard, M, to which the central gas-receiver may be screwed, as shown, and the central liquid-fuel receiver may, when preferred, be integral therewith, as shown. It is desirable that a governing-valve of some suitable description be employed in connection with such a group of burners. A preferred form of such valve consists of, as shown, a hollow cylinder having arms or radii rigidly connecting the sides of a cylinder to a central operating-rod. The periphery of this valve fits the interior side of the central fuel-receiver full (air) tight, and can be slid up and down therein in any suitable manner. The valve being hollow or provided with vertical openings between the arms, the liquid-fuel is free to pass up into the valve and through it. Where the pipes H enter the fuel receiver D in the same horizontal plane, and the valve L consists of an imperforate cylinder, its action when raised will be to simultaneously and gradually cut off communication with said pipes, and when lowered will simultaneously open communication between all of said pipes and receiver D. Where the valve L is imperforate and the pipes H enter the fuel-receiver D at different heights, the action of the valve as it rises will be to successively cut off communication between the respective pipes H, and in falling will open communication between the receiver D and one after another of said pipes H.

Instead of having the pipes H enter the receiver at different heights, I prefer that the pipes H enter the receiver in the same horizontal plane, as shown. In such event a suitable valve for controlling consecutively the feed of liquid fuel to the burners may be placed within said fuel-receiver D, and when a valve for this purpose is so placed it is preferably of the following construction. A hollow cylinder, L, is provided with openings in its sides, as $a$ $a'$ $a^2$, these openings being of different vertical depths or lengths. For example, opening $a$ is of a given depth—as, for instance, of about the diameter of the interior space of pipe H, and opening $a'$ is twice as deep as opening $a$, and opening $a^2$ is three times as deep as opening $a$. These openings are preferably at the edge of the valve, as in this way only three openings instead of four may be successfully employed to admit, cut off, and regulate the supply of liquid fuel to the four pipes H. In the present illustration three openings are at the upper edge thereof. Each opening is in a vertical line with the opening of its respective pipe H. Suppose, as in Fig. 2, communication between the main liquid-fuel-supply pipe C and the several pipes H is established. To cut-off the supply to one of the pipes H, the valve is raised, so that the mouth of one of the left-hand pipes H (see Fig. 3) is covered by the cylinder, the mouths of the remaining pipes being now in the openings $a$ $a'$ $a^2$. By pushing the valve upward the mouth of the pipe H in opening $a$ is covered, the mouths of the other pipes, respectively, in openings $a'$ and $a^2$ being still uncovered. An additional upward movement of the valve operates to cover the mouth of pipe H of opening $a'$, leaving now the mouth of one pipe H—viz., that in opening $a^2$—uncovered and in communication with its respective pipe H. A final upward movement of the valve covers the mouth of this last-named pipe H. By drawing down the valve the mouths of these four pipes H are consecutively uncovered in an order directly contrary to that in which they were covered. It is evident that the amount admitted to a given pipe can be regulated and controlled by moving the valve L to such a degree as to partially cover the opening of a pipe, H, whose feed it is desired to regulate. In the event of the automatic operation of the valve, the mouth of pipe E is gradually closed, and the amount of fuel consumed and the intensity of the flame is thus gradually reduced, and finally the flame is extinguished by the entire closing of the fuel-feed.

If the burners should be placed in two successive tiers, the liquid-fuel pipes of one tier entering into the central fuel-receptacle higher up than the liquid-fuel pipes of the other tier, then the valve L will operate to cut off the supply of liquid fuel from one tier before it cuts off the supply of liquid fuel from the other tier. The valve being made hollow, when the burner on the top of reservoir A is present, the latter may also be supplied with fuel, even though the supply to the horizontal pipes H be cut off. This constant burner may be useful for various purposes, among which may be named, keeping up steam and also working the blower of the device, and automatically lighting and relighting the remaining burners when the latter are turned on—that is, supplied with liquid fuel. The center of the valve is connected to the operating-rod P in a suitable manner, preferably by radial arms R. This rod P preferably passes downward through a packing-box, S. (See Fig. 2.) The current of air, or gas or vapor, continuing through the burner after the supply of liquid fuel has been cut off, is under certain circumstances necessary to prevent the destruction of the burner by heat. For this reason it is important to regulate the combustion by checking the flow of fuel without cutting off the supply of air, gas, or vapor. It is furthermore desirable that the valve be automatic. For example, when the liquid fuel is employed to raise steam in a boiler for any purpose, a suitable device may be connected to the boiler, whereby an undesired increase in the pressure of steam will operate this valve and diminish or cut off the liquid fuel to the burner or burners, either simultaneously or consecutively. In this manner liquid fuel may be saved, and, in case of steam-boilers, additional security against explosion be obtained.

A novel and desirable means for rendering the valve automatic is shown at Fig. 2, and is as follows: Let us suppose that the burners are employed in heating a steam-boiler. The pipe T communicates at one end with the steam-boiler, preferably with the water-space of the boiler, and at the other end with the valve box or chamber V, and usually at the lower end of said chamber, as shown. In this chamber is the piston W, and the latter or its rod or extension plays through the upper end of the said chamber. The joint between the piston and the sides of the opening in chamber V, through which said piston plays, is made fluid-tight by packing, &c., in any of the usual ways. A desirable means for packing the piston is as follows: A packing-box, m, surrounds the piston W, and its lower end, n, fits closely around the piston. Packing is introduced into the box m, and the follower p, at its upper end, surrounding and closely fitting the piston, is then screwed down within the box m, compressing the packing and causing it to bear against the piston, and making the joint between the packing and the cylinder fluid-tight. The box m is to be secured in place in any suitable manner. A convenient means for holding the packing-box m in position consists in providing the box with an annular flange, b, extending out horizontally, as shown, and bolting this annular flange to a flange, d, of the chamber V. The frame X is supported above chamber V, and usually connected thereto by means of annular flange f on its lower edge, bolted directly (or through flange b when the latter is present) to flange d of chamber V. Through the upper end of this frame the operating-rod P of the valve plays. Each of the arms $ff$ is pivoted, usually at its upper end, to the upper portion of the frame X, and the lower or free end of each arm is provided with a sphere, g, preferably capable of being adjusted and set at any desired point along its arm f. Each of the arms f is pivotally connected to the operating-rod P or upper end of the piston W by a short arm, h, the upper end of the arm h being pivoted to its respective arm f and the lower end of the said arm being pivoted to the said rod P or piston W, or to any attachment thereof—as, for example, cross-piece t, as shown. This cross-piece is in turn attached to the rod P or piston W. This cross-piece is preferably present, as it affords a more convenient place for the attachment of the arms h than does either the rod P or piston W.

The operation of this automatic cut-off valve is as follows: The burners in connection with the tubes H of the apparatus having been lighted, steam is generated in the boiler, heated by the burners, and passes through pipe T and presses against piston W. When the pressure of the steam in the boiler becomes greater than is desired, and for which the automatic device is set, the steam raises piston W and rod P and the valve L, and thus causes the latter to cut off the supply of liquid fuel from the pipe or pipes H. Where the pressure in the boiler falls below the standard pressure, the piston W will be carried down by spheres g, and the pipe or pipes H will be uncovered, and the burners thereof are to be relighted and again increase the pressure of steam. Where the parts are constructed as in Fig. 2, the central burner never goes out, and the surrounding burners being located sufficiently near will be relighted from the central burner automatically. Where the valve L, as heretofore intimated, consists of a sheet or cylinder without ports, or ports in or at the side thereof, the action of the cut-off device, essentially, of chamber V, piston W, arms $ff$, spheres $gg$, and arms $hh$, by raising the valve L, will operate (where more pipes H than one communicate with the fuel-receiver D, and are in the same horizontal or transverse plane) to simultaneously gradually cut off communication from, or as the valve L is lowered will gradually open communication with, all of said pipes H. Where the pipes H each respectively enter the fuel-receiver at a different elevation from any of the others, or the pipes H enter the said receiver in one and the same plane, but the valve L is provided with ports $a\ a'\ a^2$, as shown, the said automatic cut-off device will operate to cut off the supply of liquid fuel from the pipes H, respectively, in succession as it rises, or in its reverse movement will operate to open the pipes H, one after another. Thus the supply of heat presented to the boiler is decreased until the pressure of steam has diminished to the standard pressure. By adjusting the spheres g downward on the rods $f\ f$ or substituting heavier spheres for those on the cut-off (or in extreme changes by performing both of these operations) the standard pressure of steam permitted in the boiler may be elevated or lowered.

While the several features of my invention are preferably employed together, one or more of said features may be employed without the remainder. In so far as applicable one or more of said features may be employed in connection with devices (other than that herein particularly described) for the general purposes herein mentioned.

What I claim as new and of my invention, and desire to secure by Letters Patent, is—

1. In a device for consuming liquid fuel, the combination of the liquid-fuel receiver D, provided with side fuel-discharge openings, H, and valve sliding in said receiver for successively shutting or opening the said fuel-discharge openings, substantially as and for the purposes specified.

2. In a device for consuming liquid fuel, the combination of the liquid-fuel receiver D, hollow valve having openings $a\ a'\ a^2$, the said fuel-receiver provided with side fuel-discharge openings, H, substantially as and for the purposes set forth.

3. In a device for consuming liquid fuel, the combination of the liquid-fuel receiver D, hollow valve having openings $a\ a'\ a^2$, the said fuel-receiver provided with side fuel-discharge openings, H, and surmounted by and connected to the fuel-discharge pipe of a liquid-fuel burner, substantially as and for the purposes set forth.

4. In a device for the consumption of liquid fuel, the combination of the air or gas or vapor reservoir A, communicating with delivery-pipe E, for delivering said air or gas or vapor to the burners, and the liquid-fuel reservoir D, located within the reservoir A, and communicating with the pipes H, for the delivery of the liquid fuel to the burners, each pipe H being within its respective companion pipe E, and valve working in reservoir D, substantially as and for the purposes set forth.

5. In a device for consuming liquid fuel, the combination of a reservoir, A, and reservoir D, and outlying burners whose air or gas or vapor pipes communicate with reservoir A, and whose fuel-openings communicate with reservoir D, and valve for regulating the supply of fuel to all of the burners, except one, the latter being inextinguishable, substantially as and for the purposes specified.

6. The inlet-pipe T, valve-chamber V, piston W, rod P, arms $f\ f\ h\ h$, spheres $g$, and valve L, provided with ports, as $a\ a'\ a^2$, and reservoir D, and pipes H, substantially as and for the purposes set forth.

7. The combination of reservoirs A and D, valve L, and pipes H E, substantially as and for the purposes specified.

CHAS. L. MITCHELL.

Attest:
JNO. W. STREHLI,
O. M. HILL.